United States Patent
Masuda

(10) Patent No.: US 6,687,458 B2
(45) Date of Patent: *Feb. 3, 2004

(54) IMAGE SHAKE CORRECTING DEVICE

(75) Inventor: Kazunori Masuda, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,646

(22) Filed: Dec. 13, 1999

(65) Prior Publication Data
US 2002/0146245 A1 Oct. 10, 2002

(30) Foreign Application Priority Data
Dec. 15, 1998 (JP) .......................... 10-355590

(51) Int. Cl.$^7$ .................. G03B 17/00; H04N 5/228
(52) U.S. Cl. .................. 396/55; 348/208.99
(58) Field of Search .................. 396/52, 53, 54, 396/55; 348/208

(56) References Cited

U.S. PATENT DOCUMENTS

| 5,124,741 A | * | 6/1992 | O'Such et al. ............ 396/53 |
| 5,598,237 A | * | 1/1997 | McIntyre et al. .......... 396/264 |
| 5,615,397 A | * | 3/1997 | Shiomi et al. ............ 396/55 |
| 5,729,770 A | * | 3/1998 | Kai et al. ............... 396/53 |
| 5,761,546 A | * | 6/1998 | Imada .................... 396/55 |
| 6,006,041 A | * | 12/1999 | Mizumaki et al. ......... 396/296 |

FOREIGN PATENT DOCUMENTS

| JP | 4-56831 | 2/1992 |
| JP | 4-328534 | 11/1992 |
| JP | 9-43658 | 2/1997 |

* cited by examiner

Primary Examiner—Russell Adams
Assistant Examiner—Arthur A Smith
(74) Attorney, Agent, or Firm—Fitzpatrick, Cella, Harper & Scinto

(57) ABSTRACT

An image shake correcting device is provided for use with an apparatus (e.g., a camera) in which image shake is to be corrected. The device comprises an image shake correcting unit for correcting image shake in accordance with an output of a shake detecting unit for detecting a shake condition; a support condition determining unit for determining whether the apparatus, in which image shake is to be corrected, is supported in a predetermined stationary condition; a shutter speed information determining unit for determining a shutter speed at photo-shooting; and a varying unit for varying a response manner of the image shake correcting means to the output of the shake detecting means in accordance with a combination of the determination made by the support condition determining means and the determination made by the shutter speed information determining means. The image shake correcting device is operated in an optimum mode fit for situations in use, such as whether the apparatus (camera) is held by the hands or fixedly supported on a tripod or the like.

19 Claims, 10 Drawing Sheets

IMAGE SHAKE CORRECTING DEVICE

BACKGROUND OF THE INVENTION

1. Field of the Invention

The present invention relates to an image shake correcting device for correcting image shake caused by movement of the hands, for example, in an optical apparatus such as a camera.

2. Description of the Related Art

Hitherto, various devices have been proposed for the purpose of correcting shake of optical systems such as a camera, i.e., restricting vibrations caused by movement of the hands to stabilize an image. In a typical one of shake correcting devices for use in cameras, a part or the whole of a photographing optical system is driven in accordance with camera shake information detected by a shake sensor so that image shake on the focus plane is restricted. Such an image shake correcting device is disclosed in, for example, Japanese Patent Laid-Open No. 9-43658.

In a conventional image shake correcting device, however, it is generally known that, for satisfactorily restricting vibrations caused by movement of the hands or vibrations having a similar frequency distribution, the shake sensor, the correcting optical system, and response frequency bands of the shake sensor and the driving systems are selected and set in accordance with the target vibrations. The following disadvantages therefore occur when a conventional image shake correcting device is mounted on a tripod or the like, for use with a camera.

1) Even in the case where shake correction is not required, the shake correcting mechanism continues operation and hence power consumption is increased.

2) In a still camera, a high-frequency impact occurs, though a small amplitude of displacement, due to a mirror quickly returned at the time of release or a shutter mechanism (about 20–50 Hz for shake due to the mirror operation and about 100–200 Hz for shake due to the shutter operation), and may cause an error output of the shake sensor. In such a case, the shake correcting mechanism operates to perform shake correction unrelated to shake of the camera body, and thereby promotes image shake rather than corrects image shake.

3) Even in the case where no shake is generated, the shake correcting mechanism operates in response to a low-frequency drift signal (jitter) outputted from vibration detecting means, and performs shake correction unrelated to shake of the camera body, thus promoting image shake rather than correcting image shake.

To overcome the above disadvantages, it has been already proposed to inhibit the image shake correcting operation or to modify a characteristic of the image shake correction control upon detection of the fact that the image shake correcting device is mounted on a support member such as a tripod. The former proposal is disclosed in, e.g., Japanese Patent Laid-Open No. 4-56831, and the latter proposal is disclosed in, e.g., Japanese Patent Laid-Open No. 4-328534.

These proposals, however, have problems as follows. In the proposal disclosed in Japanese Patent Laid-Open No. 4-56831, when it is detected that an image shake correcting device is mounted on a support member such as a tripod, the image shake correcting operation is totally inhibited. Accordingly, shake of a high-frequency and small amplitude (referred to as "camera shake" hereinafter) cannot be corrected, which occurs due to the reaction upon the mirror's quick return or the shutter operation at the time of release in a camera.

Also, Japanese Patent Laid-Open No. 4-328534 intends to overcome the problem of Japanese Patent Laid-Open No. 4-56831. When it is detected that an image shake correcting device is mounted on a support member such as a tripod, the image shake correcting operation is not inhibited and a characteristic of the image shake correction control is modified. However, a characteristic of the image shake correction control is modified according to a single pattern. Optimum shake correction is not always achieved with a single pattern modification of the control, taking into account the shutter speed of a camera at photo-shooting. At a low shutter speed, for example, primarily a low-frequency drift signal (jitter) of the shake sensor becomes not negligible and a photographed image deteriorates.

SUMMARY OF THE INVENTION

One aspect of the present invention resides in an image shake correcting device applied to an apparatus (such as a camera) in which image shake is to be corrected. The device comprises an image shake correcting unit for correcting image shake in accordance with an output of a shake detecting unit for detecting a shake condition; a support condition determining unit for determining whether the apparatus, in which image shake is to be corrected, is supported in a predetermined stationary condition; a shutter speed information determining unit for determining a shutter speed at photo-shooting; and a varying unit for varying a response manner of the image shake correcting means to the output of the shake detecting means in accordance with a combination of the determination made by the support condition determining means and the determination made by the shutter speed information determining means.

With the above features, the image shake correcting device is operated in an optimum mode suitable for various use situations, such as whether the apparatus (camera) is handheld or fixedly supported on a tripod or the like.

DESCRIPTION OF THE PREFERRED EMBODIMENTS

Figure 1:
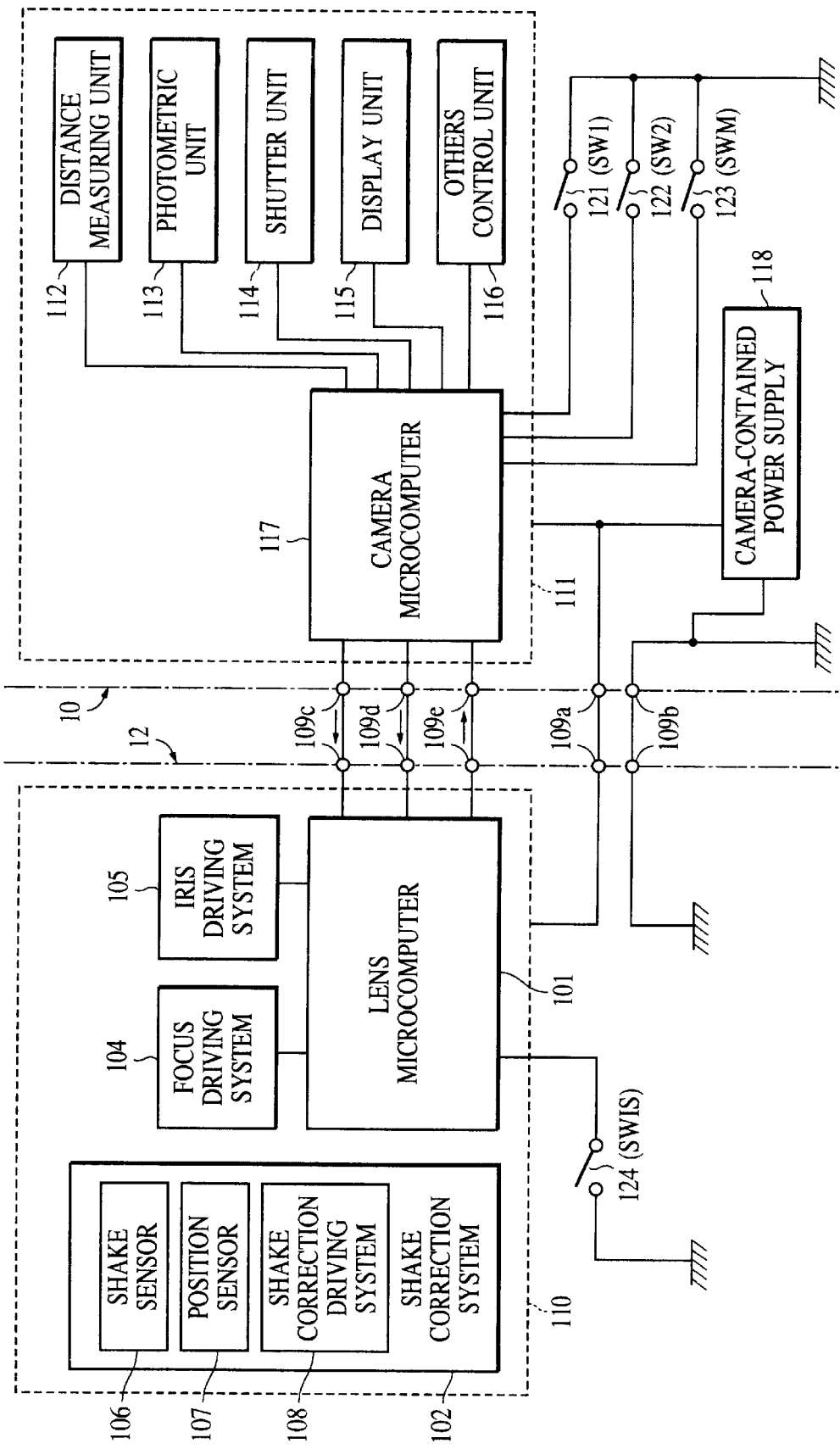
FIG. 1 is a block diagram showing the configuration of a single-lens reflex camera system including an image shake correcting device according to a first embodiment of the present invention.

The present invention will be described below in detail in connection with preferred embodiments shown in the drawings.

FIRST EMBODIMENT

A first embodiment of the present invention will be described below with reference to the drawings.

Figure 10:
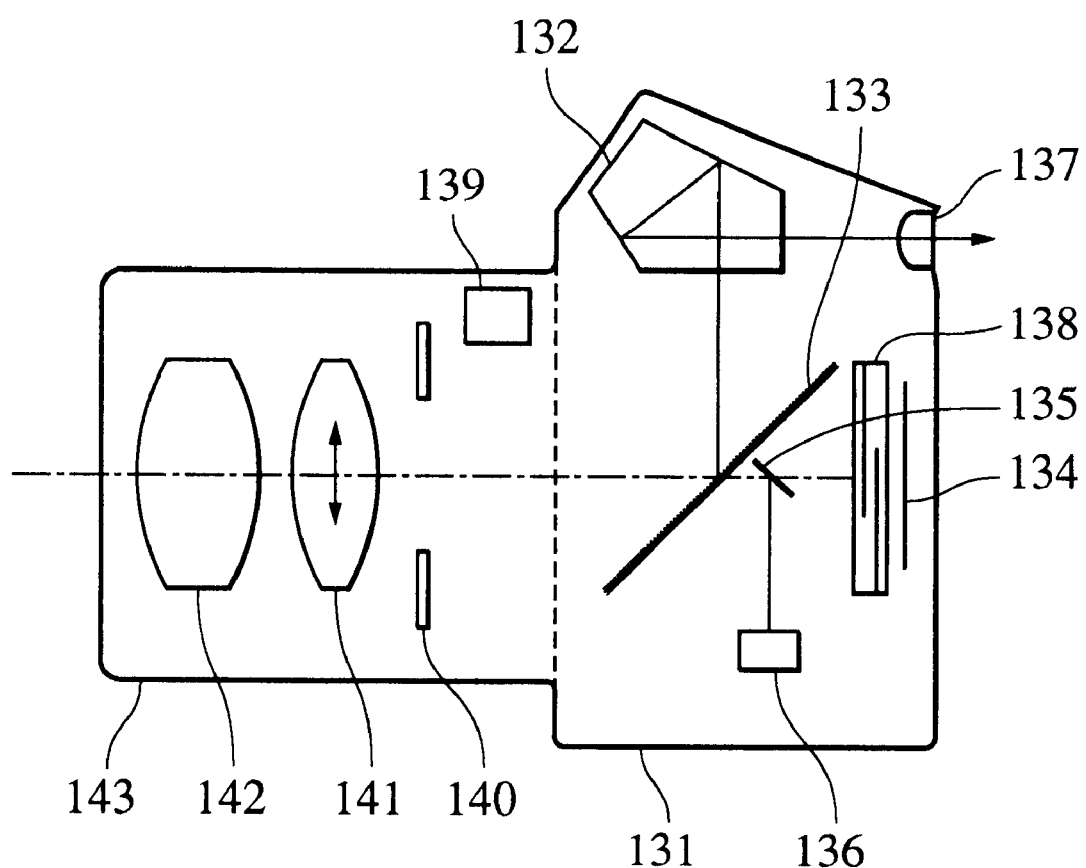
FIG. 10 shows a schematic construction of a camera system comprising a camera body and an interchangeable lens according to the first embodiment of the present invention.

FIG. 10 shows a schematic construction of a camera system comprising a camera body and an interchangeable lens according to the first embodiment of the present invention. In an illustrated condition, an interchangeable lens 143 provided with an image shake correcting device is attached to a single-lens reflex camera body 131.

The camera body 131 includes a pentaprism 132, and a semitransparent main mirror 133, fixed at its upper end, for passing a part of incident light through it toward a film surface 134 and reflecting the remaining part of incident light toward a finder optical system. Numeral 135 denotes an auxiliary mirror for introducing light to a distance-measuring sensor 136. The auxiliary mirror 135 is retracted to the lower side of a mirror box during an exposure operation. Numeral 137 denotes an eyepiece lens and 138 denotes a shutter unit.

The interchangeable lens 143 includes a shake detecting sensor 139 for detecting camera shake, a diaphragm 140, a shake correcting lens unit 141 being displaceable in a direction perpendicular to an optical axis to deflect a pencil of light so that the pencil of light bends depending on the amount of hand shake, and a lens 142.

When a release switch is depressed, the main mirror 133 is turned up and a leading screen of the shutter unit is actuated to travel, allowing an image to be exposed to the film surface 134. A succeeding screen of the shutter unit is then actuated to travel, thereby ending the exposure operation.

FIG. 1 is a block diagram of the camera system, shown in FIG. 10, in which an interchangeable lens provided with an image shake correcting device is attached to a single-lens reflex camera body.

FIG. 1 is a block diagram showing the circuit configuration of a single-lens reflex camera system including an image shake correcting device according to a first embodiment of the present invention. The right side in FIG. 1 represents a camera body 10, and the left side in FIG. 1 represents an interchangeable lens 12. The image shake correcting device is mounted in the interchangeable lens 12 in this embodiment.

Referring to FIG. 1, numeral 101 denotes a lens microcomputer which receives signals from the camera side (specifically the camera body side) through communication contacts 109c (for a clock signal) and 109d (for a signal transmitted from the camera to the lens). In response to command values of the received signals, the lens microcomputer 101 operates a shake correction system 102, a focus driving system 104 and an iris driving system 105 which are shown in FIG. 1, and performs control of the shake correction system 102.

The shake correction system 102 comprises a shake sensor 106 for detecting shake, a position sensor 107 for detecting a displacement of a compensating lens (not shown), and a shake correction driving system 108 for driving the compensating lens in accordance with a control signal to carry out the image shake correcting operation, where the control signal is calculated in the lens microcomputer 101 based on outputs of both shake sensor 106 and the position sensor 107.

Numeral 124 (SWIS) denotes an anti-shake switch for selecting the image shake correcting operation. The anti-shake switch SWIS is turned on when the image shake correcting operation is selected.

The focus driving system 104 drives a focus adjusting lens to perform a focusing operation in accordance with a command value from the lens microcomputer 101. The iris driving system 105 is operated in accordance with a command value from the lens microcomputer 101 so as to narrow an iris aperture to a set position or return it to an open state. Further, the lens microcomputer 101 transmits information regarding the lens status (focus position, f/number, etc.) and information regarding the lens (open f/number, focal distance, data required for distance measurement processing, etc.) to the camera side through communication contacts 109e (for a signal transmitted from the lens to the camera).

The lens microcomputer 101, the shake correction system 102, the focus driving system 104 and the iris driving system 105 jointly constitute a lens electrical system 110. The lens electrical system 110 is supplied with power from a camera-contained power supply 118 through supply voltage contacts 109a and ground contacts 109b.

Within the camera body 10, a camera electrical system 111 is provided comprising a distance measuring unit 112, a photometric unit 113, a shutter unit 114, a display unit 115, an others control unit 116, and a camera microcomputer 117 for executing management of the operation to start or stop those components, exposure processing, distance measurement processing, etc. The camera electrical system 111 is also supplied with power from the camera-contained power supply 118.

Numeral 121 (SW1) denotes a switch for starting photometric and distance measurement processing, and 122 (SW2) denotes a release switch for starting a release operation. These switches are usually in the form of a two-step stroke switch. When a release button is pushed through a first stroke, the switch SW1 is turned on, and when it is pushed through a second stroke, the switch SW2 is turned on. Numeral 123 (SWM) denotes an exposure mode selection switch. An exposure mode can be changed, for example, by turning on or off the switch SWM, or by operating another actuating member together with the switch SWM at the same time.

The operation on the side of the image shake correcting device (i.e., the interchangeable lens) in the camera having the above construction will be described below.

Figure 2:
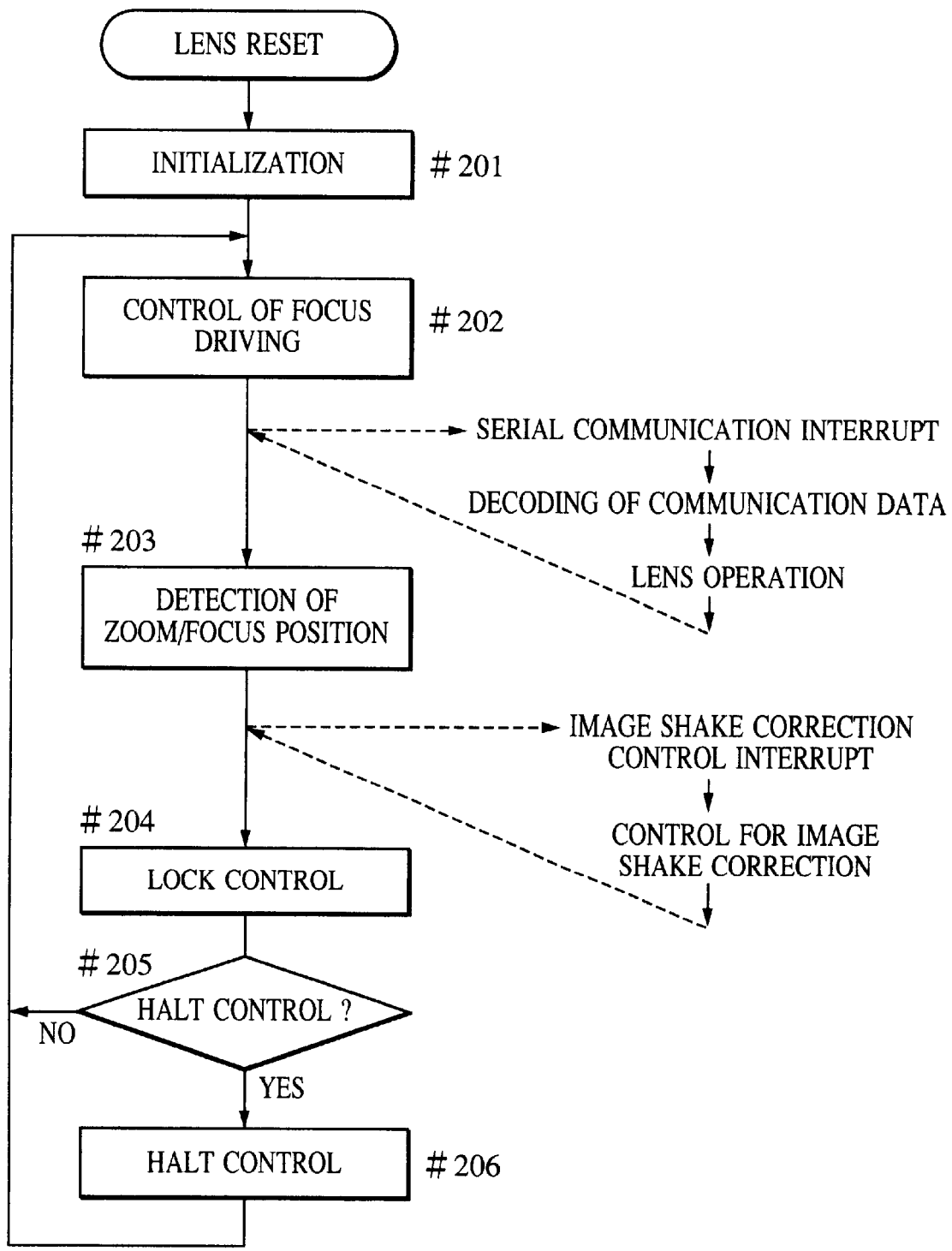
FIG. 2 is a flowchart showing the operation of a lens microcomputer in the first embodiment of the present invention.

The lens microcomputer 101 operates as shown in a flowchart of FIG. 2 to execute the lens control described above. Upon operation of switch SW1 on the camera side (i.e., half stroke depression or other appropriate operation), a signal is communicated to the lens microcomputer 101 from the camera side, whereupon the lens microcomputer 101 starts an initialization operation at step #201.

In step #201, initialization is executed for lens control and image shake correction control. In step #202, focus driving is performed in accordance with a command from the camera side. In step #203 the zoom/focus position is detected. In subsequent step #204, the image shake correcting device is controlled and set in a locked or unlocked state depending on a signal communicated from the camera side or the state of the anti-shake switch SWIS.

In step #205, it is determined whether a HALT command (to stop driving of all actuators in the lens) is received from the camera side. If a HALT command is not received, the process flow returns to step #202. If a HALT command is received, the process flow goes to step #206 in which HALT control is performed. In HALT control, the driving of all actuators in the lens is stopped and the lens microcomputer 101 is brought into a sleep (suspended) state.

During operation in the above steps, if a serial communication interrupt or an image shake correction control interrupt is requested in accordance with a signal communicated from the camera side, processing of the requested interrupt is executed. In processing a serial communication interrupt, communication data is decoded and the lens is operated for, e.g., driving of an iris. As a result of decoding of the communication data, it is possible to determine whether a main switch is turned on, whether the switch SW1 is turned on, what the shutter speed is, whether a quick return mirror is present (i.e., whether the mirror is quickly moved up), what the model of the camera is, etc. This data of the decoded information is stored in a camera information storage unit in the lens microcomputer 101.

Also, an image shake correcting operation is executed by interrupt processing which occurs at a constant cycle (e.g., 500 µsec). Because control for a first direction, e.g., a pitch (vertical) direction and control for a second direction, e.g., a yaw (horizontal) direction are performed alternately, a sampling cycle in each direction is 1 msec. If an interrupt occurs, the lens microcomputer 101 starts a processing operation beginning at step #301 in FIG. 3.

In step #301, it is determined whether the control direction at this time is the pitch or yaw direction. If the current control is for the pitch direction, the process flow goes to step #302 in which data addresses are set such that various flags, coefficients, calculation results, etc. are read and written as pitch data. If the current control is for the yaw direction, the process flow goes to step #303 in which data addresses are set such that various flags, coefficients, calculation results, etc. are read and written as yaw data.

In step #304, an output of an angular speed sensor, which serves as the shake sensor 106, is A/D-converted, and a converted result is stored in AD-DATA predefined in RAM.

It is then determined in step #305 whether the start of image shake correction is instructed. The start of image shake correction is determined as being instructed, for example, when the anti-shake switch SWIS and the switch SW1 are both turned on. If the start of image shake correction is instructed, then the process flow goes to step #306 to determine whether or not a flag is set indicating that the time for detection of the support member has lapsed. If a predetermined time has not yet lapsed, then a detection time lapse flag is set to low level (L) and process flow proceeds to step #307. In step #307, processing for detection of the support member is executed (details will be described later with reference to a flowchart of FIG. 4), and process flow proceeds to step #308. If the predetermined time has lapsed, then the detection time lapse flag is set to the high level (H), and the process flow goes to step #308 at once without executing the processing for detection of the support member.

In step #308, it is determined whether the support member is detected. If not detected, a support member detection flag is set to the low level (L), and the process flow goes to step #309, in which high-pass filter (hpf) processing for normal anti-shake control is executed. In step #310, integral processing for the normal anti-shake control is executed for conversion into an image shake angular displacement signal (BURE_DATA). On the other hand, if the support member is detected, the support member detection flag is set to the high level (H), and the process flow goes to step #311. In step #311, since the support member is detected, the cutoff frequency is set to a higher value than in the normal high-pass filter processing, thereby cutting more components of relatively low frequencies. Subsequently, in step #312, the anti-shake control upon detection of the support member is executed (details will be described later with reference to a flowchart of FIG. 6).

In step #313, an output of the position sensor 107 for detecting the position of the compensating lens is subjected to A/D conversion, and the result is stored in PSD_DATA. Then, in step #314, feedback processing "(BURE_DATA)−(PSD_DATA)" is executed. In subsequent step #315, processing for phase compensation is executed to establish a stable control system. Finally, in step #316, a processing result obtained in step #315 is output to an output port (not shown). A signal output from the output port is applied to the shake correction driving system 108, and the compensating lens (not shown) is driven to perform image shake correction.

If the start of image shake correction is not instructed in step #305, then the process flow goes to step #317, in which initialization is executed for high-pass filter processing and integral processing.

Figure 3:
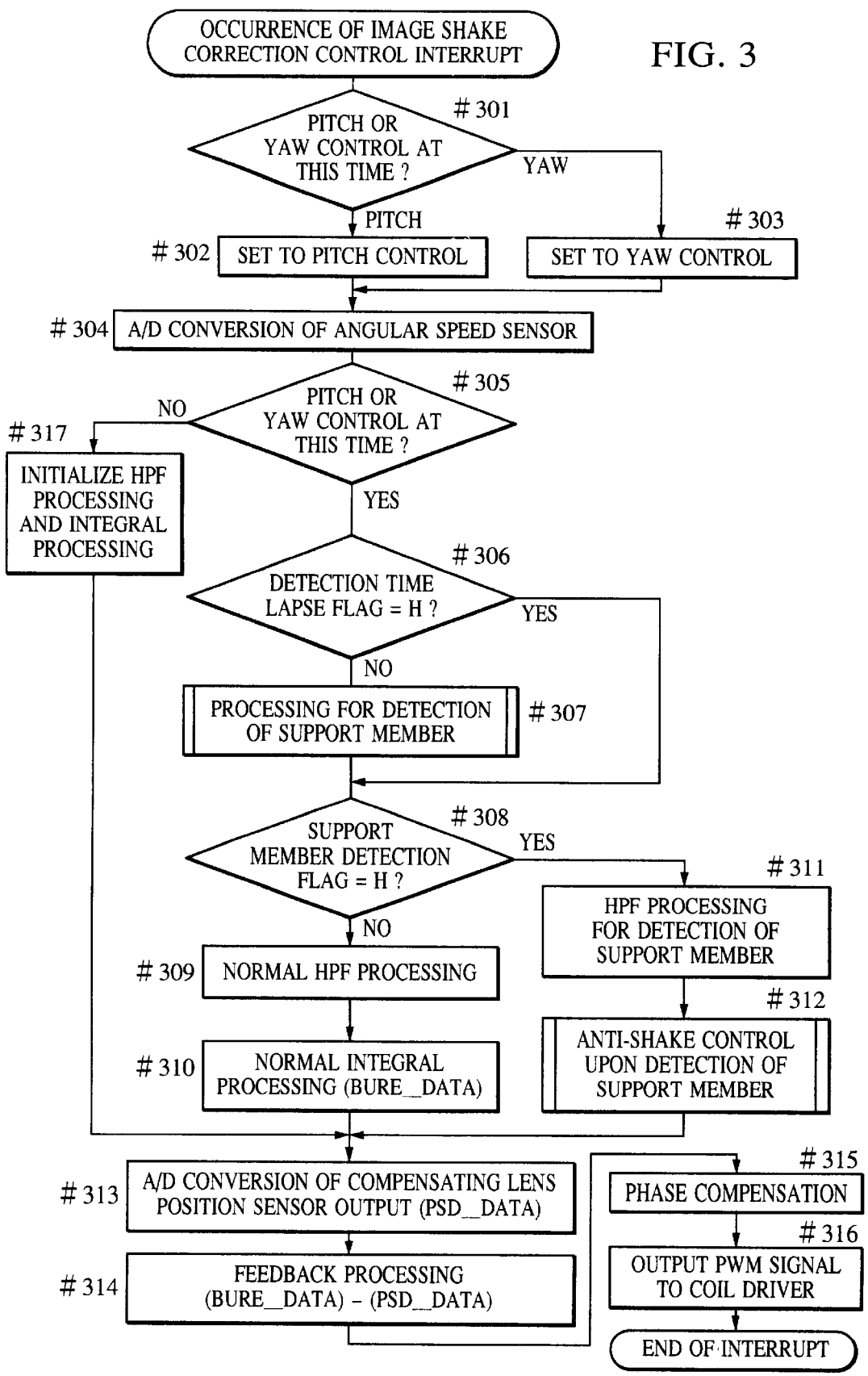
FIG. 3 is a flowchart showing the operation of an image shake correction interrupt in the first embodiment of the present invention.
Figure 4:
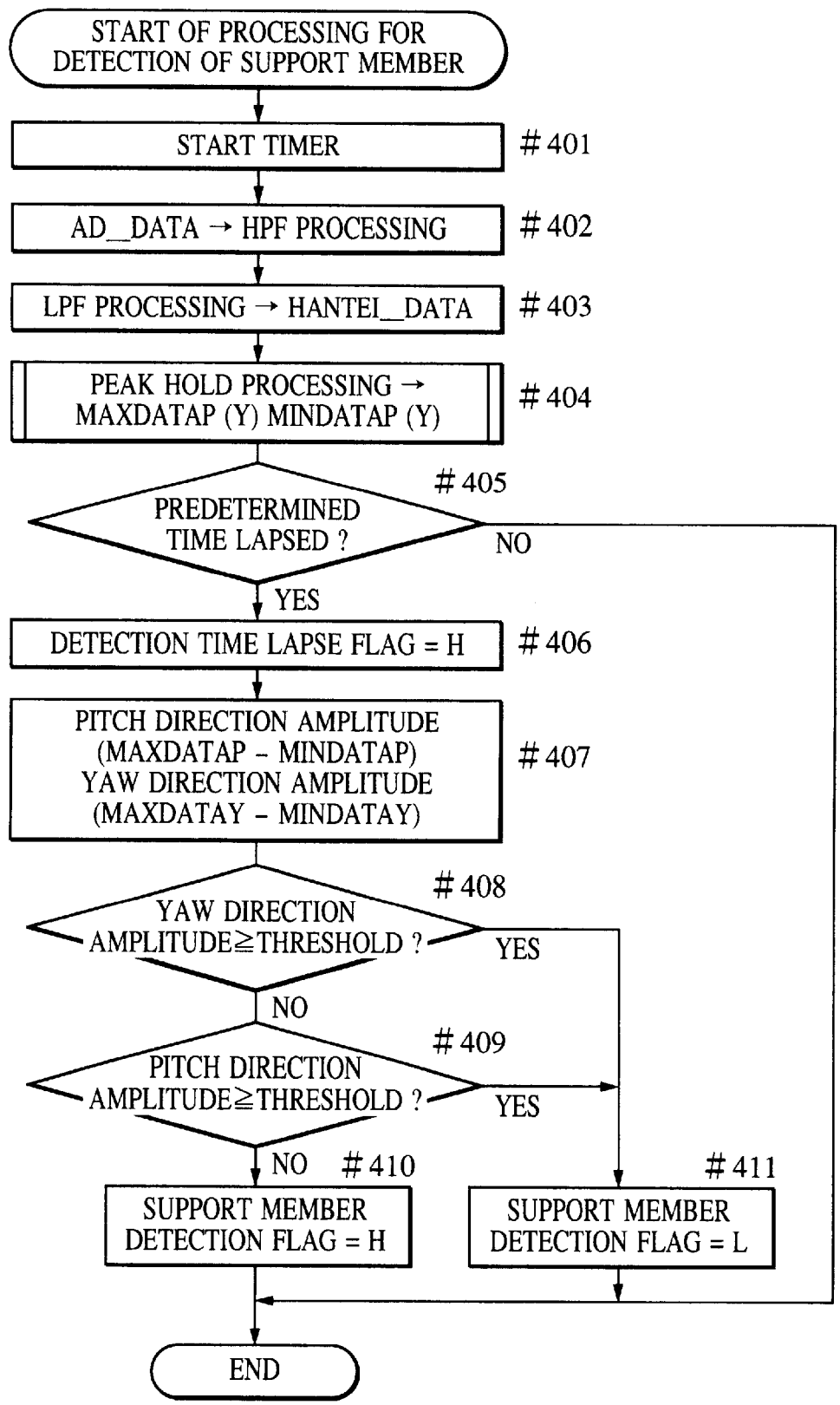
FIG. 4 is a flowchart showing the process of support member detection in the first embodiment of the present invention.

The processing for detection of the support member in step #307 of FIG. 3 will be described below with reference to a flowchart of FIG. 4.

In step #401, a time counting timer for detecting the support member is started. In next step #402, high-pass filter processing for detection of the support member (to quickly remove a DC component) is executed. An input signal used in that processing is AD_DATA in step #304 of FIG. 3. Then, in step #403, low-pass filter processing for detection of the support member (to remove high-frequency noise) is performed, and the output signal is stored in HANTEI_DATA. In subsequent step #404, peak hold processing of the HANTEI_DATA signal is executed. More specifically, the microcomputer holds maximum values (pitch: MAXDATAP, yaw: MAXDATAY) and minimum values (pitch: MINDATAP, yaw: MINDATAY) of the HANTEI_DATA signal and stores those values in the RAM.

In step #405, it is determined whether a predetermined processing time for detection of the support member has lapsed. If the predetermined processing time has not lapsed, the process flow is ended at once. If the predetermined processing time has lapsed, the process flow goes to step #406, in which a detecting time lapse flag is set to the high level (H).

After step #406, it is finally determined whether the camera is mounted on the support member. Whether the camera is mounted on the support member or not can be determined by calculating an amplitude from the maximum peak value (MAXDATA) and the minimum peak value (MINDATA) of the shake signal which are obtained in above step #404, and then comparing the calculated amplitude with a preset certain value set a level that does not result from movement of the hands.

In step #407, an amplitude in the pitch direction (MAXDATAP−MINDATAP) and an amplitude in the yaw direction (MAXDATAY−MINDATAY) are calculated. Then, in step #408, it is determined whether the amplitude in the yaw direction is not smaller than a predetermined value. If the amplitude is not smaller than the predetermined value, then it is determined that the camera is not mounted on a support member. The process flow then goes to step #411, in which the support member detection flag is set at the low level (L), and the process is ended. If the amplitude is smaller than the predetermined value, then the process flow goes to step #409 to determine the amplitude in the other direction. More specifically, it is determined whether the amplitude in the pitch direction is not smaller than a predetermined value. If the amplitude in the pitch direction is not smaller than the predetermined value, then it is determined that the camera is not mounted on a support member, and process flow proceeds to step #411. If the amplitude in the pitch direction is smaller than the predetermined value, that is, if the amplitudes in both directions are smaller than the predetermined values, then it is determined that the camera is mounted on a support member such as a tripod. The process flow then goes to step #410, in which the support member detection flag is set to the high level (H), and the process is ended.

The processing for detection of the support member is executed in the manner described above. In the process of detecting the support member, steps #401–#405 are executed for each interrupt until the predetermined time expires, and steps #406–#411 are executed only once after the predetermined time has lapsed, for making the final determination.

The anti-shake control upon detection of the support member in above step #312 of FIG. 3 will be described below.

Figure 5:
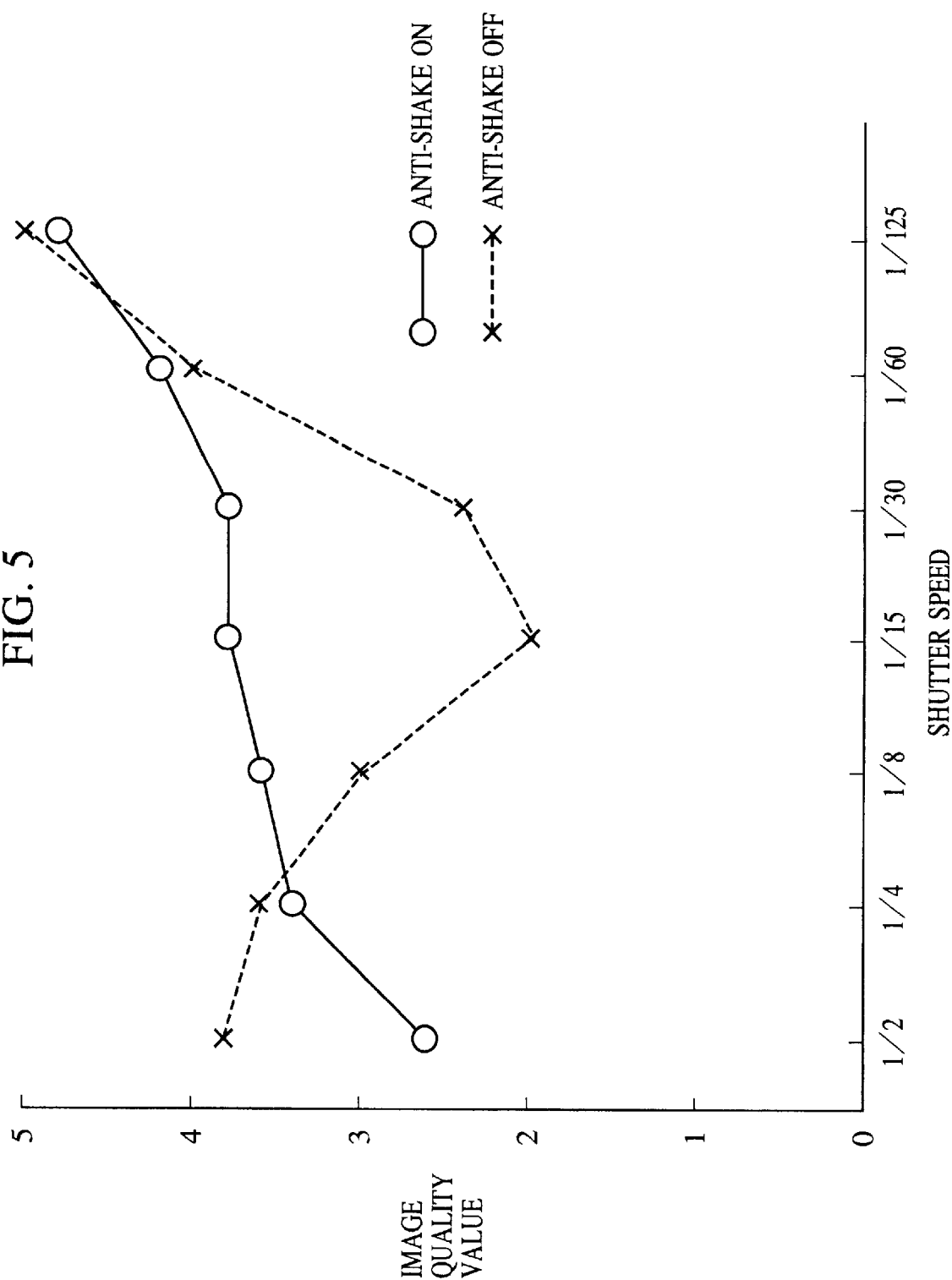
FIG. 5 is a graph showing one example of the relationship between a shutter speed and an image quality value, which is the result of evaluating resolution of a photographed image taken when the image shake correcting device is mounted on a support member (tripod) in the first embodiment of the present invention.

FIG. 5 shows one example of the relationship between a shutter speed and an image quality value (ranked based on resolution, i.e., depending on how many lines are separable within 1 mm), which results from evaluating resolution of a photographed image taken when a camera including an interchangeable lens provided with the image shake correcting device is mounted on a support member (tripod). In the graph of FIG. 5, the horizontal axis represents the shutter speed of the camera, and the vertical axis represents the image quality value calculated from the resolutions in both the pitch and yaw direction. A perfect score of the image quality value is 5 points. Note that the result of FIG. 5 was obtained in a combination of one interchangeable lens and one camera, and that the characteristic will change somewhat with different combinations of cameras and lenses.

When anti-shake control is not performed (anti-shake off), the score drops at a medium shutter speed. This is because the photographed image is adversely affected by the shake generated upon an impact applied from the quick return mirror of the camera. On the other hand, when anti-shake control is performed (anti-shake on; i.e., when the characteristic of the image shake correction control is functioning to correct camera shake), the score rises at the medium shutter speed. This is because the shake generated upon an impact applied from the quick return mirror of the camera is corrected. At high and low shutter speeds, however, the score in the anti-shake on-mode is lower than that in the anti-shake off-mode. At a high shutter speed, this is primarily attributable to the fact that shake is not appropriately corrected due to a detection delay of the shake detecting system and a correction delay of the shake correcting system for the shake generated upon an impact applied in connection with the travel of a shutter screen, or that the shake sensor produces an error output because of the shake generated upon an impact applied in connection with the travel of the shutter screen. At a low shutter speed, the reason resides in a low-frequency jitter (drift) signal from the shake sensor.

It is therefore thought that the anti-shake control upon detection of the support member is improved by changing over the control mode depending on the shutter speed so as to combine the advantageous characteristics of both control modes with each other. In the case of changing over the control characteristic, image shake correction control for keeping fixed the offset position of an optical axis is preferably employed as control equivalent to that in the mode when the anti-shake control is not effected (anti-shake off).

The anti-shake control upon detection of the support member in above step #312 of FIG. 3 will be described below with reference to a flowchart of FIG. 6.

In step #501, it is determined whether the shutter speed of the camera is not lower than a selected value, e.g., 1/60 second. The shutter speed information of the camera at photo-shooting is stored in the camera information storage unit through communication with the camera side. If the shutter speed is not slower than 1/60 second, the process flow goes to step #502, in which the image shake correction control for keeping fixed the offset position of the optical axis is performed by holding an integral signal (BURE_DATA) at a constant value, followed by ending the process. If the shutter speed is slower than 1/60 second, the process flow goes to step #503.

Since the shutter speed is now slower than 1/60 second, it is further determined in step #503 whether the shutter speed is not slower than a different selected value, e.g., 1/4 second. If not slower than 1/4 second, this means that the shutter speed is slower than 1/60 second but not slower than 1/4 second. The process flow therefore goes to step #504, in which image shake correction control for correcting the camera shake of a high-frequency and small amplitude is performed. In this manner, integral processing is executed by setting the time constant to a smaller value so that the camera shake is more precisely corrected. The process flow is then ended. If the shutter speed is slower than 1/4 second, the process flow goes to step #505, in which the image shake correction control for keeping fixed the offset position of the optical axis is performed by holding the integral signal (BURE_DATA) at a constant value, followed by ending the process.

In the above embodiment, when a support member is detected, the characteristic of the image shake correction control is changed over such that image shake correction control for keeping fixed the offset position of the optical axis is performed at a low shutter speed range, image shake correction control for correcting the camera shake is performed at a medium shutter speed range, and image shake correction control for keeping fixed the offset position of the optical axis is performed again at a high shutter speed range. However, any mode of image shake correction control selectively may be performed at any shutter speed. For example, when a support member is detected, the control mode may be changed over between image shake correction control for correcting camera shake and image shake correction control for keeping fixed the offset position of the optical axis at one certain shutter speed. Also, needless to say, when a support member is detected, the control mode may be changed over among various kinds of image shake correction control for each of a plurality of finely defined ranges of the shutter speed.

With the first embodiment, as described above, when it is detected that the image shake correcting device is mounted on a support member, the mode of image shake correction control is changed over depending on the shutter speed of the camera, between image shake correction control for keeping fixed the offset position of the optical axis by holding the shake signal outputted from the shake sensor at a constant value, and image shake correction control for correcting the camera shake of a high-frequency and small amplitude. As a result, when the image shake correcting device is mounted on a support member such as a tripod, image shake correction control can be performed in an optimum manner.

SECOND EMBODIMENT

Next, a single-lens reflex camera including an image shake correcting device according to a second embodiment of the present invention will be described.

In the above first embodiment, when a support member is detected, the characteristic of the image shake correction control is changed over depending on the shutter speed for each of both the first control direction, e.g., the pitch direction, and the second control direction, e.g., the yaw direction. In practice, however, shake generated upon an impact applied from the quick return mirror uniquely depends on a mirror mechanism of the camera, and is restricted substantially only in one direction.

Accordingly, it is preferable that when a support member is detected, image shake correction control as described in connection with the above first embodiment is performed only for the direction in which the shake attributable to the quick return mirror occurs, and image shake correction control for keeping fixed the offset position of the optical axis by holding the shake signal outputted from the shake sensor (shake detecting means) at a constant value is performed regardless of the shutter speed for the direction in which shake attributable to the quick return mirror hardly occurs.

The operation of the second embodiment constructed in view of the above will be described with reference to a flowchart of FIG. 7. The second embodiment differs from the first embodiment only in the anti-shake control process upon detection of the support member in step #312 of FIG. 3. Therefore, description of common steps to those in the first embodiment is omitted and only the anti-shake control process upon detection of a support member will be described below. It is here assumed that shake attributable to the quick return mirror occurs only in the pitch direction.

In step #601, it is determined whether control in accordance with a current interrupt is for the pitch or yaw direction. If the control is for the yaw direction, the process flow goes to step #606, in which the mode of the image shake correction control is not changed over and the image shake correction control for keeping fixed the offset position of the optical axis by holding the integral signal (BURE_DATA) at a constant value is performed, followed by ending the process. If control in accordance with a current interrupt is for the pitch direction, the process flow goes to step #602.

In step #602, it is determined whether the shutter speed of the camera is not slower than a selected value, e.g., 1/60 second. The shutter speed information of the camera at photo-shooting is stored in the camera information storage unit through communication with the camera side. If the shutter speed is not slower than 1/60 second, the process flow goes to step #603, in which image shake correction control for keeping fixed the offset position of the optical axis is performed by holding the integral signal (BURE_DATA) at a constant value, followed by ending the process. If the shutter speed is slower than 1/60 second, the process flow goes to step #604.

Since the shutter speed is now slower than 1/60 second, it is further determined in step #604 whether the shutter speed is not slower than another selected value, e.g., 1/4 second. If not slower than 1/4 second, this means that the shutter speed is slower than 1/60 second but not slower than 1/4 second. The process flow therefore goes to step #605, in which the image shake correction control for correcting the camera shake of a high-frequency and small amplitude is performed. In this manner, the integral processing is executed by setting the time constant to a smaller value so that the camera shake is more precisely corrected. The process flow is then ended. If the shutter speed is slower than 1/4 second, the process flow goes to step #606, in which image shake correction control for keeping fixed the offset position of the optical axis is performed by holding the integral signal (BURE_DATA) at a constant value, followed by ending the process.

With the second embodiment, as described above, when a support member is detected, the mode of the image shake correction control is changed over depending on the shutter speed only for the direction in which shake attributable to the quick return mirror occurs (in the pitch direction in the second embodiment), and image shake correction control for keeping fixed the offset position of the optical axis by holding the shake signal outputted from the shake sensor at a constant value is performed regardless of the shutter speed for the direction in which the shake attributable to the quick return mirror hardly occurs.

As a result, when the image shake correcting device is mounted on a support member such as a tripod, optimum image shake correction control can be more effectively performed.

THIRD EMBODIMENT

Next, a single-lens reflex camera including an image shake correcting device according to a third embodiment of the present invention will be described.

The above first and second embodiments are premised on the fact that the mirror is moved up in the exposure operation. In some cameras, however, no mirror is moved up in the exposure operation. In such a camera, because there occurs no shake attributable to an impact of the mirror-up operation, it is not required to perform image shake correction control for correcting the camera shake of a high-frequency and small amplitude. In other words, even when a support member is detected, there is no need for changing over the mode of the image shake correction control. Accordingly, it is preferable that when a support member is detected, image shake correction control is performed in the same manner as described in the first and second embodiments on a camera including a mirror which is moved up in the exposure operation, and image shake correction control for keeping fixed the offset position of the optical axis by holding the shake signal outputted from the shake sensor (shake detecting means) at a constant value is performed regardless of the shutter speed on a camera including a mirror which is not moved up in the exposure operation.

The operation of the third embodiment constructed in view of the above will be described with reference to a flowchart of FIG. 8. The third embodiment differs from the second embodiment only in the anti-shake control process upon detection of the support member in step #312 of FIG. 3. Therefore, description of common steps to those in the second embodiment is omitted and only the anti-shake control process upon detection of a support member will be described below.

In step #701, it is determined whether the mounted camera includes a mirror which is moved up in the exposure operation. If the mounted camera includes a mirror which is moved up in the exposure operation, the process flow goes to step #702, in which the mode of image shake correction control is changed over depending on the shutter speed. If the mounted camera includes a mirror which is not moved up in the exposure operation, the process flow goes to step #707, in which the mode of the image shake correction control is not changed over and the image shake correction control for keeping fixed the offset position of the optical axis is performed. Incidentally, information as to whether the mirror is moved up or not in the exposure operation is stored in the camera information storage unit through communication with the camera side.

The operation in steps #702 to #707 is the same as that in steps #601 to #606 in the second embodiment.

With the third embodiment, as described above, when it is detected that the image shake correcting device is mounted on a support member, it is determined whether the camera includes a quick return mirror which is moved up in the exposure operation. If the camera includes a quick return mirror which is moved up in the exposure operation, image shake correction control is performed in the same manner as described in the second embodiment. If the camera includes no quick return mirror, i.e., includes a mirror which is not moved up in the exposure operation, image shake correction control for keeping fixed the offset position of the optical axis by holding the shake signal outputted from the shake sensor (shake detecting means) at a constant value is performed.

As a result, when the image shake correcting device is mounted on a support member such as a tripod, optimum image shake correction control can be more effectively performed regardless of whether a mirror-up operation is made or not at the time of exposure.

FOURTH EMBODIMENT

Next, a single-lens reflex camera including an image shake correcting device according to a fourth embodiment of the present invention will be described.

In the above first to third embodiments, when a support member is detected, the image shake correction control is changed over depending on the shutter speed. However, an optimum value of the shutter speed at which the control mode is changed over, depends on a combination of various conditions, such as the weight and shape of the lens, the weight and shape of the camera, and the type and rigidity of the support member. Thus, the optimum value cannot be uniquely decided.

Figure 9:
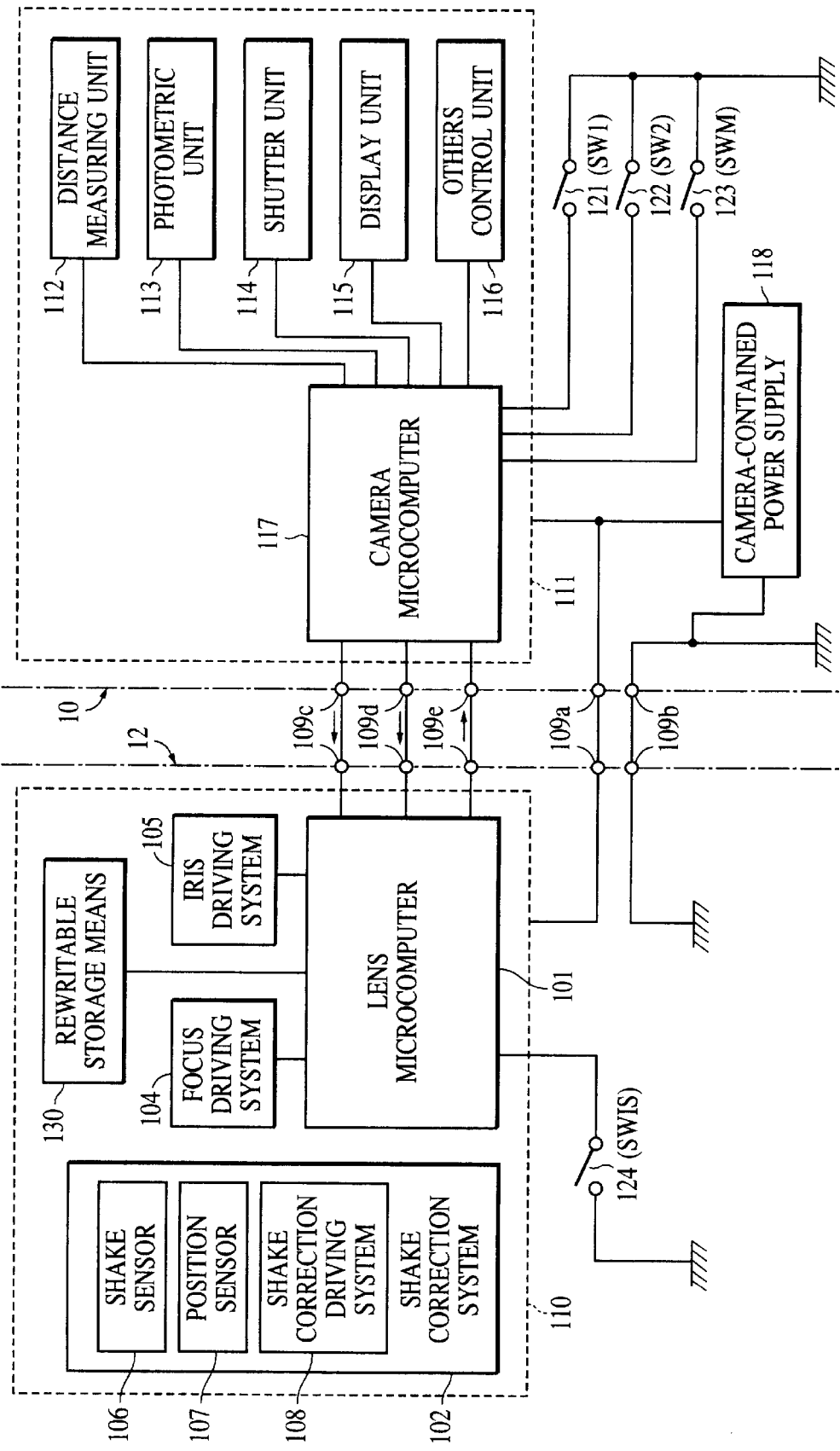
FIG. 9 is a block diagram showing the configuration of a single-lens reflex camera system including an image shake correcting device according to a fourth embodiment of the present invention.

In this fourth embodiment, therefore, a rewritable storage means 130 is provided in the image shake correcting device, as shown in FIG. 9, so that the shutter speed information used for changing over the control mode is stored in rewritable storage means 130.

Further, the shutter speed information used for changing over the control mode can be varied externally. In the first embodiment, for example, the shutter speeds for use in the determinations in steps #501 and #503 of FIG. 6 correspond to the shutter speed information used for changing over the control mode. Incidentally, the shutter speed information is rewritable externally by any suitable means, such as serial communication, parallel communication and port operation.

With the fourth embodiment, as described above, since the shutter speed information used for changing over the control mode is rewritable, it is possible to decide an optimum value of the shutter speed at which the control mode is changed over for various combinations of the lens, the camera and the support member. As a result, when the image shake correcting device is mounted on a support member such as a tripod in use of the camera, optimum image shake correction control can be more practically and effectively performed.

CORRESPONDENCE BETWEEN INVENTION AND EMBODIMENTS

Figure 6:
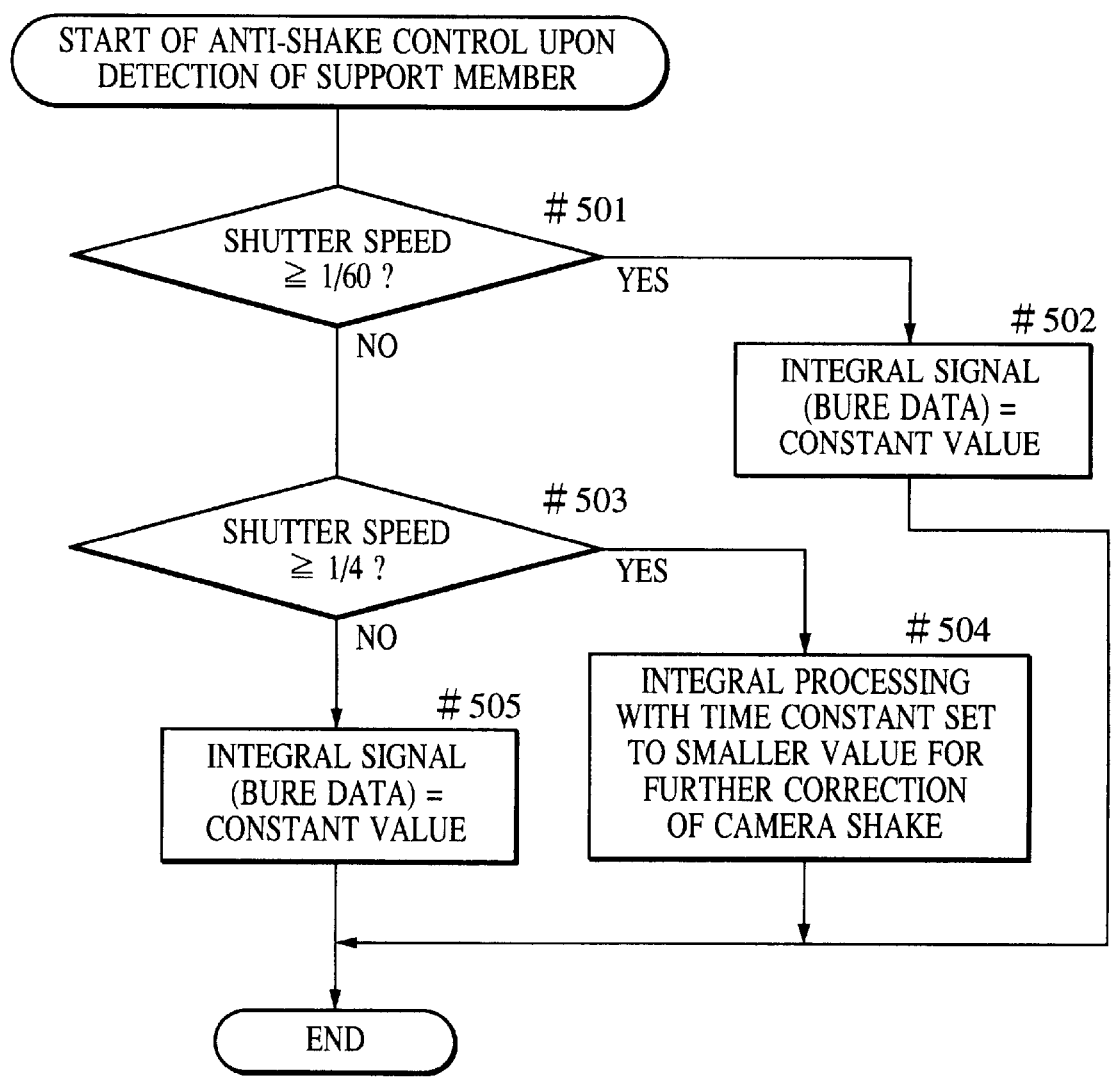
FIG. 6 is a flowchart showing the operation of image shake correction control in the first embodiment of the present invention when the support member is detected.
Figure 7:
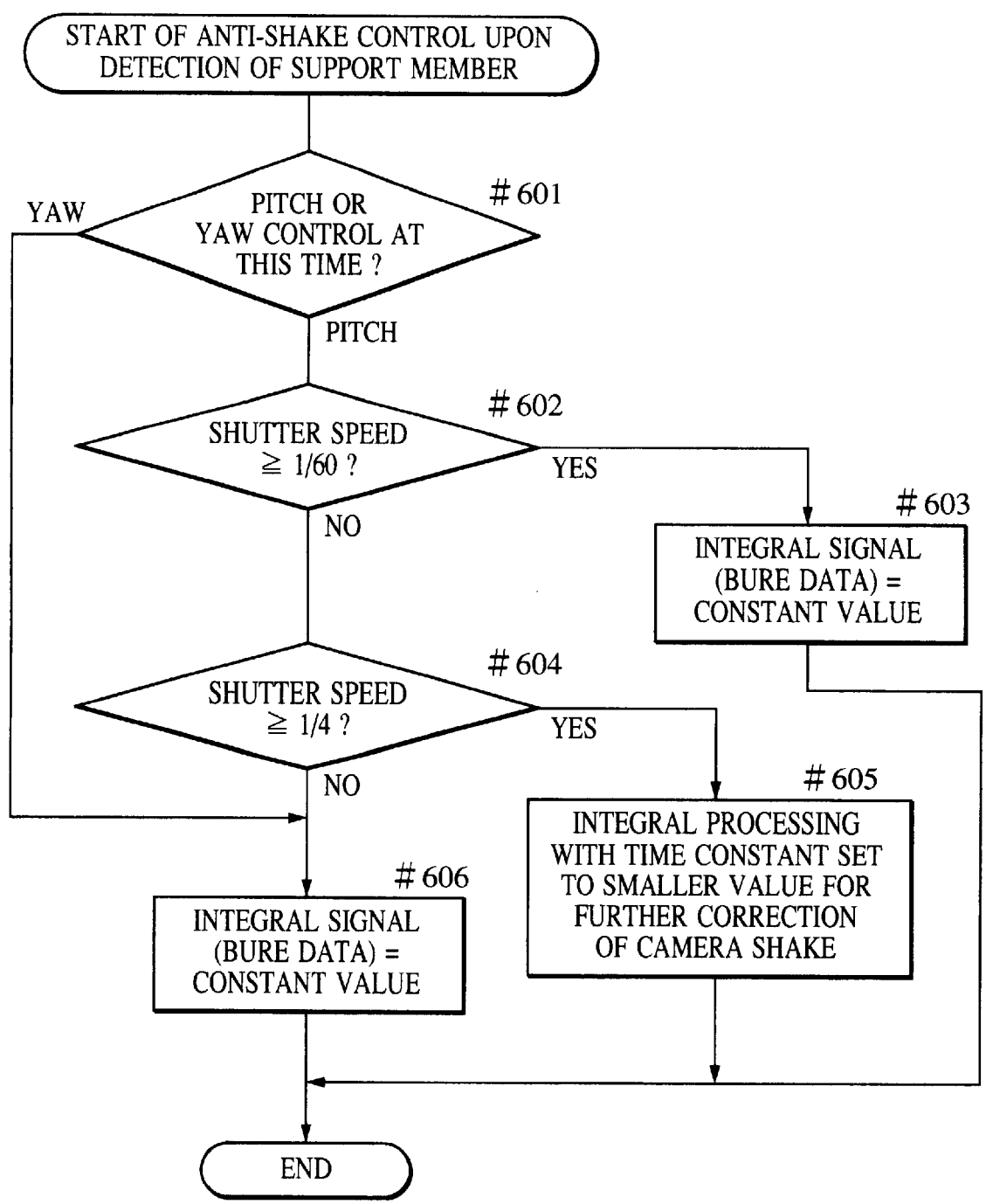
FIG. 7 is a flowchart showing the operation of image shake correction control in a second embodiment of the present invention when the support member is detected.
Figure 8:
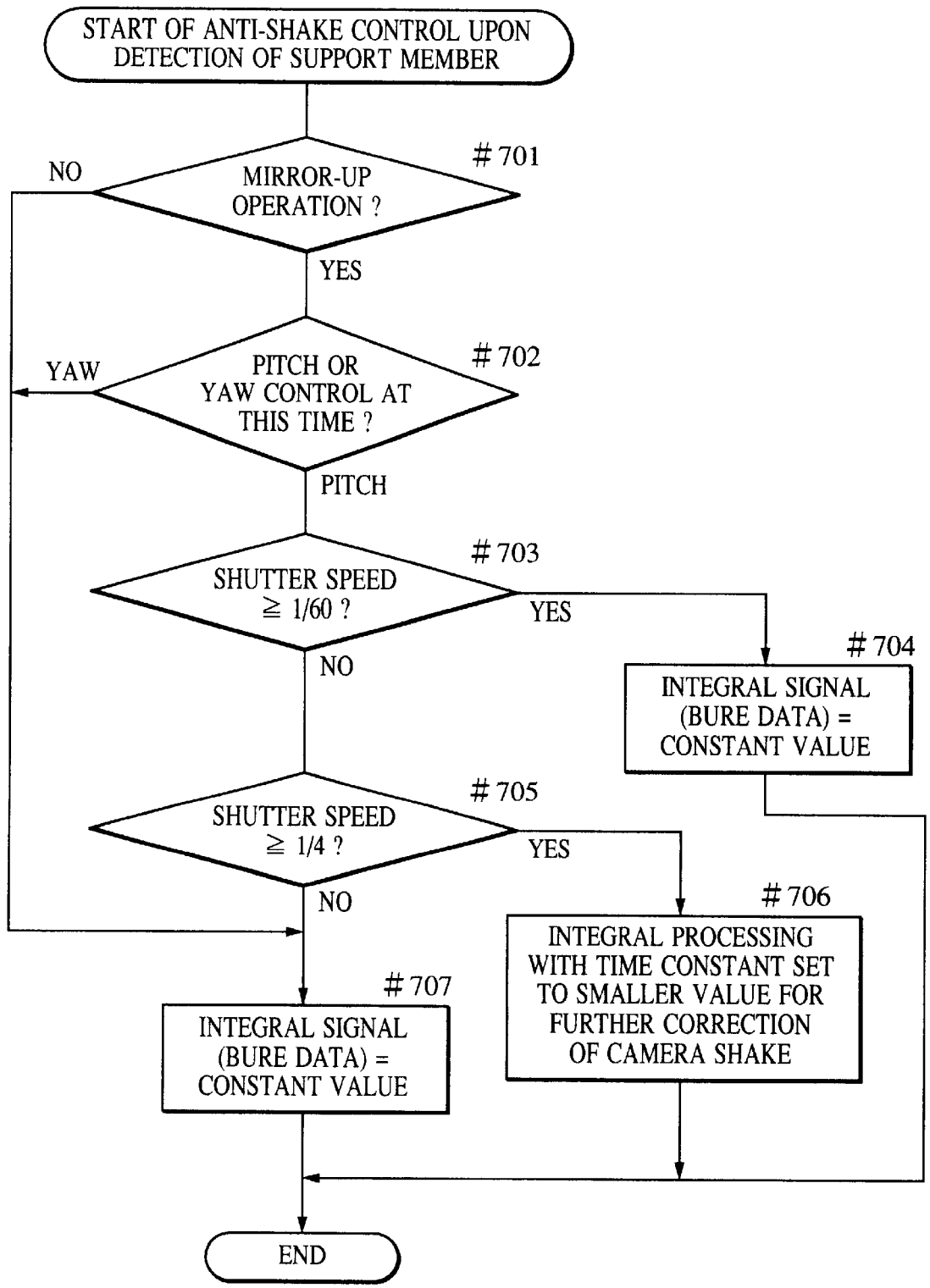
FIG. 8 is a flowchart showing the operation of image shake correction control in a third embodiment of the present invention when the support member is detected.

In the above-described embodiments, the compensating lens (not shown) corresponds to optical axis offsetting means; the shake sensor 106 corresponds to shake detecting means; the shake correction driving system 108 and the lens microcomputer 101 correspond to image shake correcting means; sections of the lens microcomputer 101 for executing the operations of steps #501, #502, #503, #504, and #505 in FIG. 6, steps #602, #603, #604, #605, and #606 in FIG. 7, and steps #703, #704, #705, #706, and #707 in FIG. 8 correspond to characteristic control means; and the quick return mirror (not shown) corresponds to an optical path changing means, respectively.

MODIFICATIONS

While an angular speed sensor is employed as the shake sensor in the above-described embodiments, the shake sensor may comprise any suitable shake detecting means, including an angular acceleration sensor, an acceleration sensor, a speed sensor, an angular displacement sensor, and a displacement sensor, so long as it is able to detect shake.

Also, the optical axis offsetting means in the present invention may comprise any suitable offsetting means, including an optical shift system for moving an optical member in a plane perpendicular to the optical axis, a light flux changing means utilizing an apical angle, and a means for moving a photographing frame in a plane perpendicular to the optical axis, so long as it is able to correct image shake.

Further, the shutter speeds employed for use in the determinations in steps #501 and #503 of FIG. 6, etc. are optimum in one combination of an interchangeable lens and camera body, but sometimes may not be optimum in other combinations of lenses and camera bodies. It is therefore possible to store sets of plural shutter speeds which are used in making the determinations and fit the various possible combinations, and to select an appropriate one of the sets depending on the result of determining the types of camera body and interchangeable lens used. The characteristic of the image shake correction control is changed over based on the shutter speeds of the selected set.

While in the present embodiments it is determined whether the camera is supported on a tripod or the like in accordance with the output of a shake sensor, such a condition may be detected based on information transmitted from a switch which is turned on when the camera is mounted on a tripod.

The present invention or the embodiments thereof may be constructed in the form of one device as a whole, or in the form of devices separated or combined with others, or an element as one component of an apparatus.

Additionally, while the embodiments have been described as applying the present invention to a single-lens reflex camera, the present invention can be also applied to various types of cameras such as a video camera, an electronic still camera and a lens shutter camera, optical equipment and other devices besides the cameras, devices employed in the cameras, the optical equipment and other devices, as well as elements of them.

According to the foregoing embodiments of the present invention, as described above, an image shake correcting device can be provided which, when a piece of optical equipment is mounted on a support member, the image shake correction control can be performed in an optimum manner.

Further, according to the foregoing embodiments of the present invention, an image shake correcting device can be provided which, when a camera is mounted on a support member, the image shake correction control always performs in an optimum manner regardless of what shutter speed is selected.

While the present invention has been described with reference to what are presently considered to be the preferred embodiments, it is to be understood that the invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image shake correcting device for use with a photo-taking apparatus including a shutter which performs a shutter operation at a photo-taking operation, comprising;
    a shake detector that generates an output in accordance with a shake condition of the photo-taking apparatus;
    image shake correcting means for correcting image shake in accordance with the output of said shake detector;
    support condition determining means for determining whether the photo-taking apparatus is supported in a stationary condition;
    shutter speed information determining means for determining a shutter speed of said shutter, and whether or not the detected shutter speed is within a predetermined range of shutter speeds; and
    varying means for selectively varying an operation mode of said image shake correcting means in accordance with a combination of the determination made by said support condition determining means and the determination made by said shutter speed information determining means, wherein, when said support condition determining means determines that said photo-taking apparatus is supported in the stationary condition, said varying means variably selects a mode of operation in which an image shake correcting operation is performed in accordance with the output from said shake detector to said image shake correcting means, and a mode of operation in which said image shake correction means is maintained in a predetermined state, in accordance with the determination made by said shutter speed information determination means.

2. An image shake correcting device according to claim 1, wherein,
    when said support condition determining means determines that the apparatus is supported in the stationary condition, and said shutter speed information determining means determines that the shutter speed is in the predetermined range, said varying means selects a mode of operation in which said image shake correcting means performs image shake correcting in accordance with the output of said shake detector, and
    when said support condition determining means determines that the apparatus is supported in the stationary condition, and said shutter speed information determining means determines that the shutter speed is outside the predetermined range, said varying means selects a mode of operation in which said image shake correcting means maintains a predetermined state without performing image shake correcting in accordance with the output of said shake detector.

3. An image shake correcting device according to claim 2, wherein,
    when said support condition determining means determines that the apparatus is supported in the stationary condition, and said shutter speed information determining means determines that the shutter speed is in the predetermined range, said varying means selects a mode of operation in which said image shake correcting means performs image shake correcting in accordance with the output of said shake detector, and
    when said support condition determining means determines that the apparatus is supported in the stationary condition, and said shutter speed information determining means determines that the shutter speed is slower than the predetermined range, said varying means selects a mode of operation in which said image shake correcting means maintains the predetermined state without performing image shake correcting in accordance with the output of said shake detector.

4. An image shake correcting device according to claim 2, wherein,
    when said support condition determining means determines that the apparatus is supported in the stationary condition, and said shutter speed information determining means determines that the shutter speed is in the predetermined range, said varying means selects a mode of operation in which said image shake correcting means performs image shake correcting in accordance with the output of said shake detector, and
    when said support condition determining means determines that the apparatus is supported in the stationary condition, and said shutter speed information determining means determines that the shutter speed is faster than the predetermined range, said varying means selects a mode of operation in which said image shake correcting means maintains the predetermined state without performing image shake correcting in accordance with the output of said shake detector.

5. An image shake correcting device according to claim 1, wherein said varying means includes means for changing an operation frequency characteristic of said image shake correcting means in accordance with a combination of the determination made by said support condition determining means and the determination made by said shutter speed information determining means.

6. An image shake correcting device according to claim 5, wherein,
    when said support condition determining means determines that the apparatus is not supported in the stationary condition, said varying means selects a mode of operation in which said image shake correcting means performs image shake correcting in accordance with a first frequency characteristic,
    when said support condition determining means determines that the apparatus is supported in the stationary condition, and said shutter speed information determining means determines that the shutter speed is in a predetermined range, said varying means selects a mode of operation in which said image shake correcting means performs image shake correcting in accordance with a second frequency characteristic different from the first frequency characteristic, and when said support condition determining means determines that the apparatus is supported in the stationary condition, and said shutter speed information determining means determines that the shutter speed is outside the predetermined range, said varying means selects a mode of operation in which said image shake correcting means maintains a state different from the state of image shake correcting in accordance with the second frequency characteristic.

7. An image shake correcting device according to claim 6, wherein, when said support condition determining means determines that the apparatus is supported in the stationary condition, and said shutter speed information determining means determines that the shutter speed is outside the predetermined range, said varying means selects a mode of operation in which said image shake correcting means maintains a predetermined state without performing image shake correcting in accordance with the output of said shake detector.

8. An image shake correcting device according to claim 5, wherein, when said support condition determining means determines that the apparatus is not supported in the stationary condition, said varying means selects a mode of operation in which said image shake correcting means performs image shake correcting with a first operation frequency characteristic, and when said support condition determining means determines that the apparatus is supported in the stationary condition, and said shutter speed information determining means determines that the shutter speed is in a predetermined range, said varying means selects a mode of operation in which said image shake correcting means performs image shake correcting with a second operation frequency characteristic set at a frequency higher than the first operation frequency characteristic.

9. An image shake correcting device according to claim 1, wherein said image shake correcting means includes means for optically correcting image shake.

10. An image shake correcting device according to claim 1, wherein said image shake correcting means includes means for correcting image shake by deflecting light flux.

11. An image shake correcting device according to claim 1, wherein said support condition determining means determines whether the apparatus is supported in the stationary condition in accordance with the output of said shake detector.

12. An image shake correcting device according to claim 11, wherein said support condition determining means determines whether the apparatus is supported in the stationary condition in accordance with an amplitude of the output of said shake detector.

13. A lens apparatus detachably attached to a photo-taking apparatus having a shutter, comprising:

a vibration detector that detects vibration;

an optical correcting unit that corrects image vibration caused by vibration in the lens apparatus, in accordance with an output of said vibration detector;

a support condition determining unit that determines whether or not the photo-taking apparatus is supported in a stationary condition;

a shutter speed information determining unit that determines a shutter speed of the shutter, and whether or not the determined shutter speed is in a predetermined range of shutter speeds; and a varying unit that selectively varies an operation mode of said optical correcting unit in accordance with a combination of the determination made by said support condition determining unit and the determination made by said shutter speed information determination unit, wherein, when said support condition determining unit determines that the photo-taking apparatus is supported in the stationary condition, said varying unit selects one of a mode of operation in which a correcting operation is performed corresponding to the output from said shake detector to said optical correcting unit, and a mode of operation in which said optical correcting unit is maintained in a predetermined state, in accordance with the determination made by said shutter speed information determining unit.

14. An optical apparatus including a lens apparatus and a photo-taking apparatus having a shutter, detachably attached to the lens apparatus, said optical apparatus comprising:

a vibration detector that detects vibration;

an image shake correcting unit that corrects image shake caused by the vibration, in accordance with an output from said vibration detector;

a support condition determining unit that determines whether or not the photo-taking apparatus is supported in a stationary condition, a shutter speed information determining unit that determines a shutter speed of the shutter, and whether or not the determined shutter speed is in a predetermined range of shutter speeds; and a varying unit that selectively varies an operation mode of said image shake correcting unit in accordance with a combination of the determination made by said support condition determining unit and the determination made by said shutter speed information determining unit, wherein, when said support condition determining unit determines that said photo-taking apparatus is supported in the stationary condition, said varying unit selects one of a mode of operation in which said image shake correcting unit corrects image shake in accordance with an output of said vibration detector, and a mode of operation in which said image shake correcting unit is maintained in a predetermined state, in accordance with the determination made by said shutter speed information determining unit.

15. An optical apparatus including a lens apparatus and a photo-taking apparatus, wherein the lens apparatus includes a vibration detector that detects vibration and an optical correcting unit that corrects image shake caused by the vibration in accordance with an output of the vibration detector, wherein the photo-taking apparatus includes a shutter that performs a shutter operation at a photo-taking operation, and a movable member detachably attached to the lens apparatus which switches a photo-taking light from the lens apparatus between a non-photo-taking condition and a photo-taking condition, said optical apparatus comprising:

a support condition determining unit that determines whether or not the photo-taking apparatus is supported in a stationary condition;

a shutter speed information determining unit that determines a shutter speed of the shutter, and a varying unit that selectively varies an operation mode of the optical correcting unit in accordance with a combination of the determination made by said support condition determining unit and the determination made by said shutter speed information determining unit, wherein, when said support condition determining unit determines that the photo-taking apparatus is supported in the stationary condition, said varying unit selectively varies the operation mode of said optical correcting unit in accordance with an influence of vibration generated by a switching operation of the movable member in a photo-taking operation at the shutter speed determined by said shutter speed information determining unit.

16. A lens apparatus including a movable member that switches a photo-taking light between a non-photo-taking condition and a photo-taking condition, detachably attached to a photo-taking apparatus including a shutter that performs a shutter operation in the photo-taking condition, and further including a vibration detector that detects vibration and an optical correcting unit that corrects image shake caused by the vibration in accordance with an output of the vibration detector, said apparatus comprising:

a support condition determining unit that determines whether or not the photo-taking apparatus is supported in a stationary condition, a shutter speed information determining unit that determines a shutter speed of the shutter, and a varying unit that selectively varies an operation mode of the optical correcting unit in accordance with a combination of the determination made by said support condition determining unit and the determination made by said shutter speed information determining unit, wherein, when said support condition determining unit determines that the photo-taking apparatus is supported in the stationary condition, said varying unit selectively varies the operation mode of said optical correcting unit in accordance with an influence of vibration generated by the switching operation of the movable member in the photo-taking operation at the shutter speed determined by said shutter speed information determining unit.

17. A lens apparatus having an electrical contact point, and detachably attachable to a photo-taking apparatus having an electrical contact point for contacting the contact point of said lens apparatus so as to communicate with said lens apparatus, said lens apparatus comprising:

a vibration detector that detects vibration;

an optical correcting unit that corrects image shake caused by the vibration in accordance with an output of said vibration detector;

a support condition determination unit that determines whether or not the photo-taking apparatus is supported in a stationary condition;

an operation information determining unit that communicates via the electrical contact points of the lens apparatus and the photo-taking apparatus and determines whether or not the photo-taking apparatus includes a movable member that performs a moving operation at a photo-taking operation of the photo-taking apparatus;

a shutter speed information determination unit that communicates via the electrical contact points of the lens apparatus and the photo-taking apparatus and determines the shutter speed of said photo-taking apparatus; and a varying unit that selectively varies an operation mode of said optical correcting unit in accordance with a combination of the determination made by said support condition determination unit, the determination made by said operation information determination unit and the determination made by said shutter speed information determination unit, wherein, when said support condition determination unit determines that the photo-taking apparatus is supported in the stationary condition and said operation information determination unit determines that the photo-taking apparatus has a movable member, said varying unit selectively varies the operation mode of said optical correcting unit in accordance with an influence of vibration generated by operation of said movable member in a photo-taking operation at the shutter speed determined by said shutter speed information determination unit.

18. An optical apparatus includes a lens apparatus, having an electrical contact point, and a photo-taking apparatus detachably attached to said lens apparatus, and provided with an electrical point for contacting the electrical contact point of said lens apparatus so as to communicate with the lens apparatus, said optical apparatus comprising:

a vibration detector that detects vibration;

an image shake correcting unit that corrects image shake caused by vibration, in accordance with an output of said vibration detector;

a support condition determination unit that determines whether or not the photo-taking apparatus is supported in a stationary condition;

an operation information determination unit that determines by communication via the respective electrical points whether or not the photo-taking apparatuses includes a movable member that performs a moving operation at a photo-taking operation of said photo-taking apparatus;

a shutter speed information determination unit that determines by communication via the respective electrical contact points a shutter speed of the photo-taking apparatus; and a varying unit that selectively varies an operation mode of said optical correcting unit in accordance with a combination of the determination made by said support condition determination unit, the determination made by said operation information determination unit, and the determination made by said shutter speed information determination unit, and wherein, when said support condition determination unit determines that the photo-taking apparatus is supported in the stationary condition, and said operation information determination unit determines that the photo-taking apparatus has a movable member, said varying unit selectively varies the mode of operation of said optical image shake correcting unit in accordance with an influence of vibration generated by operation of the movable member in a photo-taking operation at the shutter speed determined by said shutter speed determination unit.

19. An optical apparatus including a lens apparatus and a photo-taking apparatus having a shutter, said optical apparatus comprising:

a vibration detector that detects vibration;

an image shake correcting unit that corrects image shake caused by the vibration, in accordance with an output from said vibration detector;

a support condition determining unit that determines whether or not the photo-taking apparatus is supported in a stationary condition;

a shutter speed information determining unit that determines a shutter speed of the shutter, and whether or not the determined shutter speed is in a predetermined range of shutter speeds; and a varying unit that selectively varies an operation mode of said image shake correcting unit in accordance with a combination of the determination made by said support condition determining unit and the determination made by said shutter speed information determining unit, wherein, when said support condition determining unit determines that said photo-taking apparatus is supported in the stationary condition, said varying unit selects one of a mode of operation in which said image shake correcting unit corrects image shake in accordance with an output of said vibration detector, and a mode of operation in which said image shake correcting unit is maintained in a predetermined state, in accordance with the determination made by said shutter speed information determining unit.

* * * * *

UNITED STATES PATENT AND TRADEMARK OFFICE
CERTIFICATE OF CORRECTION

PATENT NO. : 6,687,458 b2  
DATED : February 3, 2004  
INVENTOR(S) : Kazunori Masuda It is certified that error appears in the above-identified patent and that said Letters Patent is hereby corrected as shown below:

<u>Column 18,</u>  
Line 32, "apparatuses" should read -- apparatus --.

Signed and Sealed this

Twenty-second Day of June, 2004

JON W. DUDAS  
*Acting Director of the United States Patent and Trademark Office*